W. R. PALMER.
Thrashing Machine.
No. 11,051.
2 Sheets—Sheet 1.
Patented June 13, 1854.
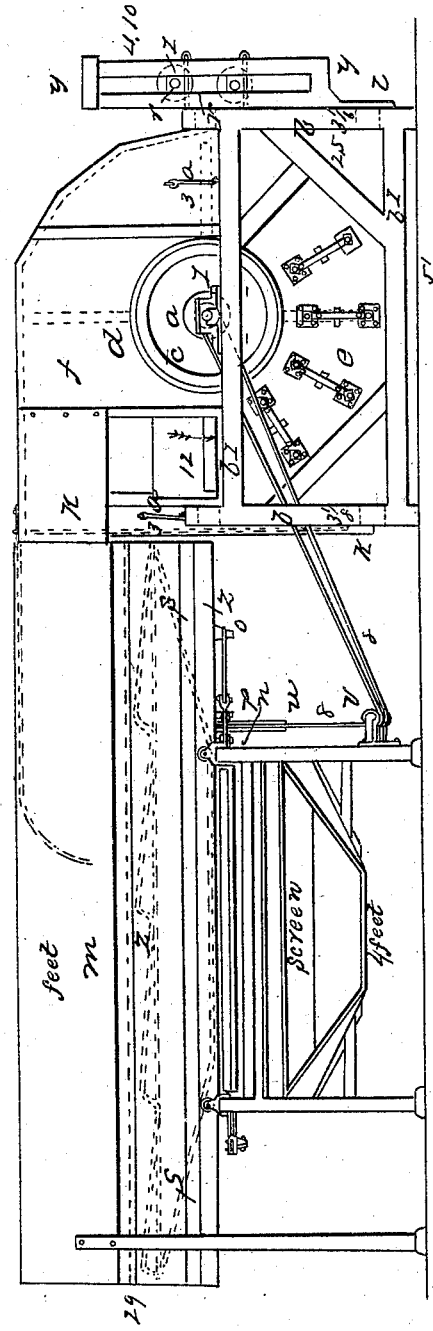
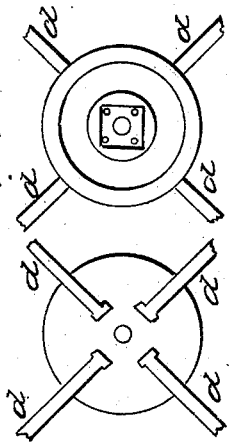
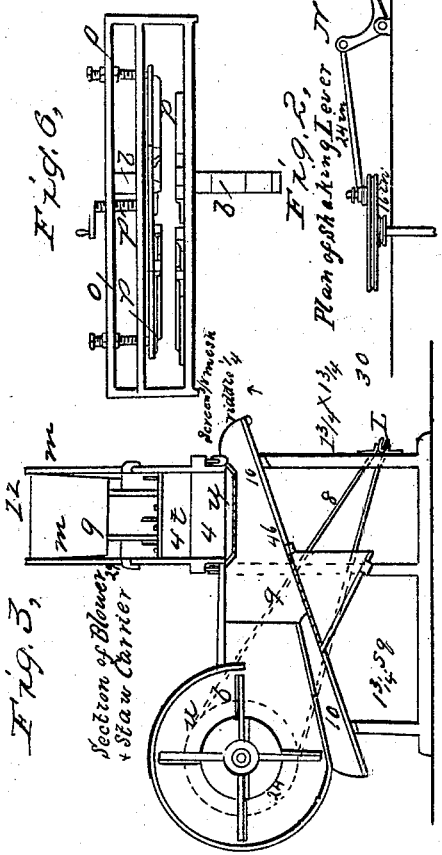

W. R. PALMER.
Thrashing Machine.
No. 11,051.
2 Sheets—Sheet 2.
Patented June 13, 1854.
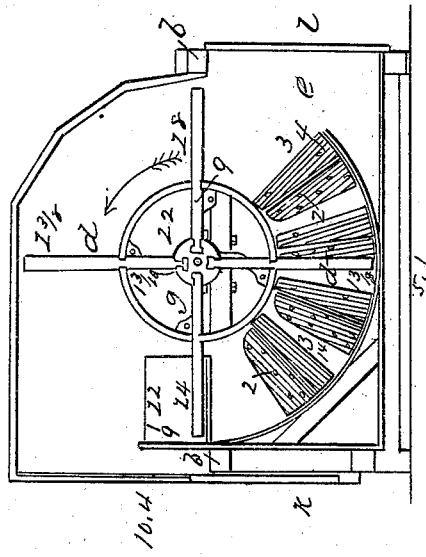
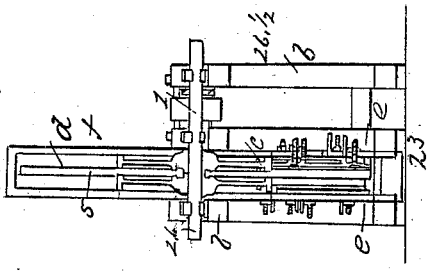
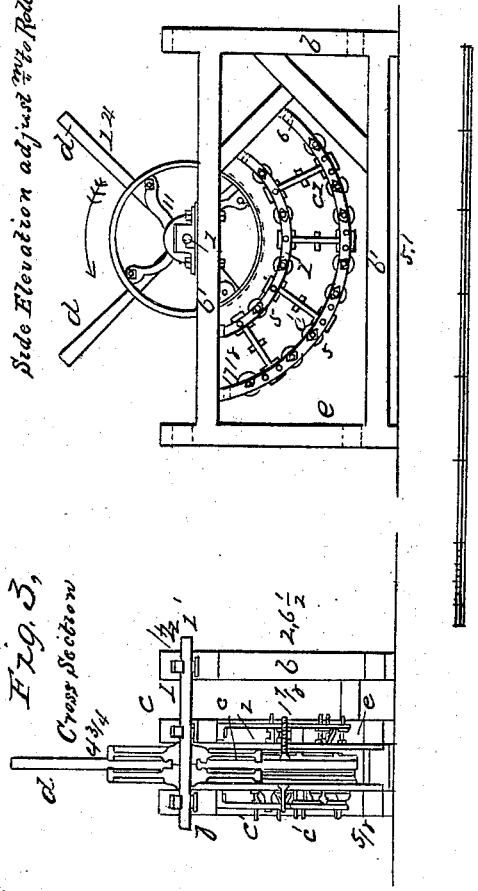
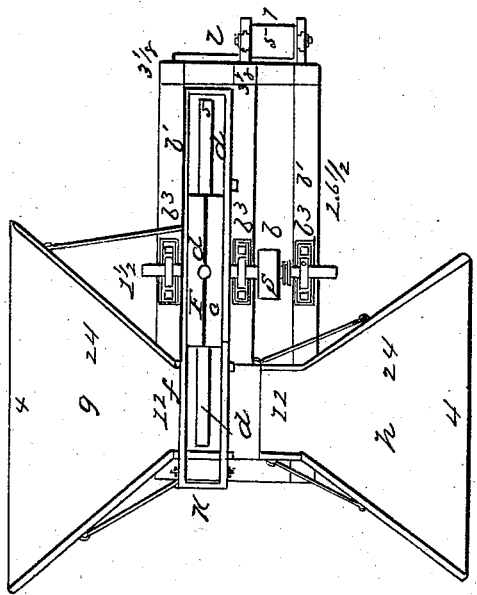

UNITED STATES PATENT OFFICE.

WM. RUSSELL PALMER, OF ELIZABETH CITY, NORTH CAROLINA.

THRESHER.

Specification of Letters Patent No. 11,051, dated June 13, 1854.

*To all whom it may concern:*

Be it known that I, WILLIAM RUSSELL PALMER, of Elizabeth City, in the county of Pasquotunk, in the State of North Carolina, at present a resident of the city and county of New York, in the State of New York, have invented a new and useful Improvement in Machines for Threshing all Kinds of Seeds and Grains, as wheat, oats, &c., excepting Indian corn, and for separating and cleaning the same when threshed from the straw and chaff, and which I designate as "Palmers American rotary seed and grain thresher and winnower;" and I hereby declare that the following is a full and exact description of my said invention, reference being had to the accompanying drawings, (Plates I and II,) and to the letters of reference, marked thereon, the same letter and letters in the various figures referring to the same part or parts of the machine, and which form a part of this specification.

Plate I exhibits a plan of my rotary threshing machine, showing views of its different parts, and also of different ways of constructing portions of it. Plate II shows the winnower, in combination with the thresher, exhibiting the method of its connection and the manner of its working with the thresher.

One great and important feature of my invention or machine, consists in its being so contrived and arranged, that it can be easily and readily adapted to the threshing of any and every kind of seed or grain (excepting Indian corn) from the smaller and finer seeds as flax and grass seed to the larger and coarser grains, as wheat, barley and peas; and also to its being well adapted to threshing the same kind of grain, under different circumstances, whether the straw is damp and the grain shrunk, or the straw dry and the kernel ripe and plump. This end is attained and secured by the plan or contrivance of adjustment applied to the rotary part of my machine and the rubbers, as will hereafter be fully explained. My thresher is also peculiarly adapted to the threshing of rice.

The nature of my invention consists in a combination of rotating flails $d, d, d, d$, with adjustable rubbers, 3, 3, 3, 3, so arranged in respect to each other, on the opposite sides of the trough or flail case, in which the flails rotate, that the seed or grain to be threshed is driven by the rotating flails, alternately from side to side of the flail case, and acted upon successively by the rubbers attached to the opposite sides of the flail case.

The frame work of my machine I usually make of strong upright posts, six in number, three at each end $b, b, b, b, b, b$, and connected lengthwise by framing $b^1, b^1, b^1$. and well strengthened by braces. The arrangement of this frame work, may however be varied according to the size and locality of the machine, and where great economy of material is desirable, only a single set of upright posts need be used, in which case they should be placed nearly central— lengthwise with the machine—so as to furnish a support for the shaft of the rotating flails $d, d, d, d$, and these posts should also extend above the hood, $f$, and have cross framing at top and bottom. Such an arrangement of frame work is shown by the little model, accompanying the larger one (to which detached model, the bottom of the flail case is not attached) and is also represented by Fig. 6 Pl. I, the upper part of the frame work, and of the hood being removed.

For ordinary purposes the thresher and winnower, and their adjuncts, may be made upon the scale indicated in the drawings, though this scale may be varied according to the particular cases to which the machines are to be applied, according to the quantity of power to be used. When the machine is designed for threshing a particular kind of grain or the lighter kinds of grains, it may be smaller and not as strongly built as in other cases; while in one of my double machines which has two rotating sets of flails, between which should be placed a fly wheel of considerable weight, the whole machine will of necessity have to be both larger and stronger.

To the middle of the cross framing $b', b',$ or to the posts in Fig. 6, Pl. I, is attached the flail shaft 1, constructed with three journals, which turn in suitable pillow blocks $b^3, b^3, b^3,$ secured to the cross framing $b^1, b^1, b^1$. To a part of the shaft between two of the framings, $b^1, b^1,$ is attached a belt pulley $b^2$, by which motion is communicated to the shaft from any convenient and suitable power, and from which I generally prefer to give to the rotaries a velocity of about 1500 times a minutes though the speed may be varied according to the kind and condition of the grain. Upon this part of the shaft is also put a grooved pulley $x$, Fig. 1, Plate I, not quite as large as the driving pulley $b^2$, from which motion is communicated by a round band to the winnower and fanning mill. Another similar grooved pulley may also be put on the shaft to fill some wanted use such as to move a light roller way to run the bundles through a trough hopper toward the thresher, as fast as the bands are cut, or for any other contrivance to lighten labor. To that part of the shaft between the other cross frames is attached the drum $c$, in which are inserted and fastened the rotating flails $d, d, d, d$. By means of the two rollers $r^1, r^1$, Pl. II, Fig. 1, at the end of the thresher, and which move up and down in the frame work $y$, I am enabled at pleasure to tighten or loosen the belt passing over the pulley $b^2$.

When the drum is solid, as is represented in the model and made of metal, the flails should screw into it, for the distance of three or four inches, with a deep cut screw and when deemed necessary, the flails may also in such case, have an additional fastening by means of a key passing through the drum and flail, or by means of a side wedge, fitting in a groove partly in the drum and partly in the flail. The drum may also be made of wood, in which case I generally fasten the flails by means of a head or burr, on the inner end of the flail and fitting to the periphery of the drum, as shown in Fig. 7, Pl. I. The drum may also be constructed as shown in Figs. 2 and 4, Pl. I, where it is composed of two half drums so framed each with semi circular recesses in the hub and tire, as to receive and hold when placed together the flails $d, d, d, d$. The two half sections of the drum are firmly bolted together by screws passing through the arms, and thus the flails fitting by means of their grooves and collars in the recesses of the tire and hub are firmly held in position, and rendered incapable of being dislodged or thrown out by centrifugal force, I prefer this latter plan of building the drum though any plan may be adopted which will make the flails perfectly firm and safe.

The flails are generally made of round iron varying in size, according to the particular proposed use of the machine from a diameter of half an inch to that of an inch and a half or even greater. In the model the flails are of different sizes, intended to represent the diameters, above referred to, but in a working machine the flails or rotaries are, as a matter of course, all of a given size. The number of flails may also be increased though for all ordinary and practical purposes, I esteem four to be enough, and they may also be made of square bars of iron, with the corners taken off, so as to assimilate their shape to a round.

The series of flails or rotaries, revolve in the direction indicated by the arrows, Plate I, Figs. 2 and 4, and Plate II, Fig. 1, in a trough or flail case $e$, placed within the framing $b$. This flail case may be made, either of wood or metal and may be firmly attached to the frame work, or it may be so constructed that it can be easily disconnected and removed.

In Fig. 2, Pl. I, and Fig. 1, Pl. II, $f$, is a hood or upper half, of the flail case, resting upon and secured to the framing $b$, and $b^1$, by means of hooks $3^a, 3^a$, or in any other convenient manner. This hood protects the rotaries, prevents accidents, and regulates when desired the point of exit of the threshed grain, and conducts it to the winnower, hereafter more particularly described.

Upon the inner sides of the flail case, $e$, are attached the beaters 2, 3, 2, 3, Plate I, Fig. 2. These beaters are generally four in number, on each side of the trough, and the two series, on the opposite sides of the trough, are so arranged, with respect to each other, that the beaters of one series are opposite the spaces, between the beaters of the other series. These beaters are triangularly shaped having their broadest ends toward the circumference of the flail case, and are separated from each other, by a space of about three or four inches. The adjustable rubbers 3, 3 are separated from each other by spaces about once and a half, or their own width.

The beaters are composed of two parts a flanch, 2, and a rubber, 3, both of which have uneven or mill like furrowed surfaces, the particular construction of which will be hereafter explained. The flanch 2, is firmly and permanently screwed to the sides of the flail case, $e$, and has upon the side of it next to the rubber, a flange which projects out, as far as the thickness of the rubber and which tends to prevent any straw, grain, or any foreign matter from passing under the rubber, when in any of its various conditions of adjustment. Between the flanch 2, and the rubber, 3, there is a small space or opening, directly underneath, or behind which I make two or three openings through the sides of the flail case, by means of which arrangement I obtain a current of air, from the outside and directly upon the grain while being threshed, whenever the rotaries are put in motion. The use of this current or blast of air, will be alluded to hereafter. Near to the flanch 2, and on its side having the flange, I place a rubber 3, Plate I, Figs. 2, 8, to which is attached set screws, 4, 4, 4, 4, Plate I, Figs. 2, 8 and 9, 4 and Plate II, Fig. 1 by means of which the face of the rubber may be set at any required distance from the track in which the rotaries revolve. These screws pass through the sides of the trough, e, and are acted on by a nut, on the outside, working against a small iron plate, as shown in Fig. 1, Pl. II. By means of these screws, and their nuts and the small blocks Fig. 10, Pl. I, the rubbers are moved and kept at any required distance from the rotaries according to the size, and character of the grain to be threshed. When the smaller and finer seeds are to be threshed, the rubbers should be brought nearer the rotaries, and when the machine is to be used for threshing the coarser grains, the space between the rotaries, and the rubbers must be enlarged.

The blocks Fig. 10, are inserted between the flail case e, and rubber 3, through the cross opening x, Fig. 1, Pl. II, and are moved to any required position, where they are held by the screws of the rubber, being tightened upon them. These blocks are made with a flattened metal projection or handle, v, Fig. 10, which enables them to be easily moved, and which also acts as a guard or support, for other plates, which may be added to them to increase their thickness, according to the increased space made between the flail case, and the rubbers, in their different conditions of adjustment. The rubbers 3, may be adjusted in various ways, other than that before described, two modes of which, are represnted in the drawings, one in Figs. 3 and 4, and the other in Fig. 6, Pl. I.

In the plan represented in Fig. 4, Pl. I., I make use of two iron plates or sectors 5 and 6, which are attached to the outer sides of the flail case, e, and firmly bolted thereto. These plates do not however rest upon the sides of the flail case, but are kept about two or three inches therefrom, by means of short columns c' c', Figs. 3 and 4, Pl. I, placed between them, and the sides of the flail case: through these columns pass the scrows which fasten the plates. When this plan is adopted the rubbers are adjusted by means of two nuts, on each screw attached to the rubber, one nut taking the outside of the flail case and the other nut taking the back of the plate or sector. In this arrangement I generally prefer that the rubber should have two screws at its broader end, Figs. 3 and 4, and I also use at the same end a block Fig. 10, to insure a greater stability to the rubber.

In the plan represented in Fig. 6, Pl. I., all the rubbers on one side of the flail case, are cast solid with and made a part of an iron plate, p, the whole of which is adjustable by means of the central screw and crank, p' and the screws attached to each end. Each screw has two nuts, one taking the inside of the side piece, o, and the other nut taking the outside of the same piece. The central screw is attached to the plate, p, by a shoulder, and head or bur, on the inner side of the plate, and is worked by a crank, through the cross piece, and in a mitt attached to the outer surface of the flail case, e, it has a thread cut upon it, its entire length, and by it the whole plate with its rubbers, is moved near to or farther from the rotaries where it is retained by the screws and nuts, attached to the ends of the plate. In this arrangement, but a single flanch is made use of, on each side of the flail case, and this is placed at that end of the plate, p, with which the rotaries first come in contact.

Another method of adjustment may be made use of, by having the rubbers made permanent upon the sides of the flail case, and inserting different sized rotaries in the drum, according to the grain to be threshed, in which arrangement, the finer and smaller the grain, the larger must be the rotary, to more nearly fill the space between the opposite rubbers. In another method of adjustment the rubbers are firmly fixed to the sides of the flail case, e, and then the whole side of the flail case, is moved nearer to, or at a greater distance from the rotaries. In such a case, the length of the axle or shaft, between its bearings on the sides of the flail case will be diminished or increased in length, in proportion as the sides of the flail case are brought nearer together or moved farther apart, or rubbers of different thicknesses may be substituted in place of each other, and thus the distance between the rotaries and the rubbers increased or diminished. Other ways of adjustment may be devised and used, but the particular plan is of but little importance, so long as the device or principle, remains the same. In cases also where threshers are desired for threshing a particular class of grains and seeds, of about the same size, and where cheapness of construction is sought, I construct them with the same formation and combination of the rotaries and rubbers, but without having any of the parts adjustable, in which case they are none the less effective, but cannot thresh grains of very different character, or sizes.

The rubbers 3, 3, 3, 3, and the flanches 2, 2, 2, 2, have both uneven, or furrowed surfaces, as represented in Plate I, Fig. 2, and also move fully in Fig. 8, Pl. I. The shape of the furrows or grooves upon them, is somewhat peculiar, and is the result of design and experiment in reference to the particular use for which they are intended. Fig. 8, shows an end view of the rubber and flanch: from an examination of this figure it will be seen that the uneven surface is neither a waved one as

nor serrated nor tooth shaped as

but somewhat as follows

the depression on one side of the groove, being nearly right angled to the surface, while the angle on the other side is much more obtuse, and the inclination longer and easier. The rotaries when in motion move up these inclines and not down them and strike first the highest point of the surface of the rubber, and then fall or vibrate into the groove and then pass up the inclined part to the next highest point, and so on from one groove to another. By this means and particularly by reason of the sudden concussion given the straw, by the fall or vibration of the rotary, from the top to the bottom of the groove the grain, is separated from the husk, while at the same time the kernel is not broken or crushed, nor the grain thus injured for marketable purposes. If the rotaries however, are made to revolve in a contrary direction passing down the inclines, and striking directly against the perpendicular surfaces of the grooves, the grain though it will be threshed none the less effectually will be very much broken and crushed. I am aware that it has been attempted to use waving surfaces in connection with a revolving drum, but these waving surfaces have generally been placed at or near the outer periphery, or circumference of the drum, or so that the periphery of the drum should act upon the waving surfaces, but rubbers and beaters have never before been constructed, as far as I have been able to learn, in the manner above illustrated and explained, nor have they ever before been so contrived and arranged as that by them a thresher could be adapted to the threshing of different kinds of seeds and grains.

The grain or seed to be threshed is fed at the sides of the machine, and not in front of the revolving part as is usually done in the various threshing machines now in use. It may be fed in by means of hoppers of any convenient shape, which may be placed on either, or on both, or on but one side of the machine. I prefer however that the grain be fed on both sides. The grain is carried by the rotaries, down into the flail case, e, where it is subjected to the action of the rotaries upon the rubbers and the operation of threshing completed.

In ordinary cases, except when the straw separator and winnower is attached to and used with the thresher, the grain when threshed is discharged at $l$, the opposite aperture $k$, in such case being closed with a slide, $k^1$, Pl. II, Fig. 1. But if the straw separator and winnower, are used with the thresher, $l$, is closed by a slide, and the threshed grain is discharged at K.

The slide $K^1$ is not attached to the model, as there is no occasion for such slide when the separator is attached to the thresher, as is the case in the model.

In cases also where grain, as wheat, is affected with smut, I make the point of exit of the threshed grain at K, thus requiring it to make the entire circuit of the flail case, $e$, and hood, $f$, and generally when the grain is smutty, I do not attempt to clean it at the same time it is threshed, and therefore do not use the winnower. From experiment I find that I am thus enabled the more effectually to remove the smut and frequent trial has demonstrated, that grain affected to a considerable extent with smut, when simply threshed in my rotary threshing machine, is more completely cleansed from the taint than when run through ordinary smut machines.

The manner in which my thresher acts so satisfactorily and wonderfully in the removal of smut, I conceive to be something as follows: Allusion has before been made to the relative situation of flanches 2, 2, and the rubbers 3, 3, that there was a small space left between them, underneath or behind which openings were made in the sides of the flail case $e$. Whenever the rotaries revolve, a constant current of air is put in motion, through such openings and between the flanches and rubbers, which act directly upon the grain, while it is being threshed. The threshing is in fact equivalent to a hard and continued rubbing of the grain between the rotaries and the rubbers, which would of itself tend to remove or loosen the smut from the grain, and so long as this operation is going on, a constant stream of air is also acting upon the grain. The combined result of the two operations is to remove almost entirely all the smutty particles. This end is also secured more completely by having the opening $l$ closed, and forcing the grain to be discharged at K, the rapid revolution of the rotaries imparting such a velocity to the straw and grain as to cause them when discharged from the machine, to be both carried some distance from it, wholly separated to a very great extent from each other. The current of air coming in through the openings behind the rubbers, and that created by the rotaries themselves form thus a continued blast, acting upon the grain, the natural effect of which is to remove particles of smut or of any other kind, which may be in contact with the kernel, and this end will be more completely attained if the thresher while in operation can be so placed (which I always do when it is possible) that a strong cross current of air can be made to act upon the straw and grain after it is discharged from the machine. In ordinary threshing machines the grain and straw usually are all thrown together, and the smut which has been broken by the operation of threshing is thus more likely to affect the whole mass, while in my thresher the strong and continued air currents which act upon the straw and grain, have a natural tendency to separate the two, and clean the grain from smut or dirt as well as from the straw.

From the peculiar construction of my thresher, I am also able to thresh grain without injuring or breaking the straw. This end is very desirable, particularly in the neighborhood of cities, and everywhere, where straw is valuable for other purposes than fodder or litter. When it is desired thus to preserve the straw for marketable or other purposes, where long straw is required the straw is not permitted to pass into and through the flail case, e, but only the grain end is applied to the rotaries, and acted on by them, the other end of the straw being retained in the grasp of the operator. Any kind of grain may be threshed in this manner, and generally I prefer to thresh flax, in this manner, and without having the straw pass through the machine. Whenever grain is threshed in this manner, the machine will of course accomplish a less amount of labor, in any given time, but the actual power required to effect the separation of the grain from the straw is so much less than that needed in the other way of threshing, that a fly wheel with a crank, and turned by hand will effect nearly as much as a single horsepower, when the straw is fed into the machine. When grain is thus threshed so as to preserve the straw, the threshing is not effected by the contact of the rubbers with the rotaries but by means of the rapid and violent blows of the revolving rotaries applied directly upon the seed ends and heads of the grain.

When it is desired to clean the grain at the same time it is threshed, I attach to my thresher, a winnower, as represented in Pl. II., consisting of straw separator and fanning mill. These are attached to that end of the machine, at which the grain is fed into the thresher, as represented in Plate II. Fig. 1. The straw separator, is made of the same width with the thresher and consists of a long trough m within which is a wire grating z, the arrangement of which is shown in the drawing by dotted lines. The trough, m, is in fact but a continuation of the hood, f, and the two are generally made as one part. The straw and grain are both thrown off, near the top of the extended hood into the long trough m, but are prevented from being thrown too far by the descending hood or curve 7, as shown by the dotted lines in the side elevation, Plate II, Fig. 1, the grain and straw, having been thrown into the trough m, fall on the wire grating z, placed toward the bottom of the trough m. This grating runs the whole length of the trough and each alternate wire is bent up, as shown in the figure so as to make a series of inclines, which shall keep shoving the straw toward, and out of the ends of the trough furtherest from the thresher. The trough m rests on rollers, on the top of the winnower, and has a vibratory motion, given to it from the blower of the winnower by means of the crank o, Pl. II, Fig. 1 and Pl. 11, Fig. N. 2, which is attached by connecting bars at one end to the trough m, and at the other end to a crank pin p, Pl. II, Fig. 1, on the blower pulley the fulcrum being formed by a bracket, r, Pl. II, Fig. 1, from the frame of the winnower.

By the motion given to the trough m, the straw is carried off at its extreme end, and the grain falls through the wire grating z, and on to hopper board S, S, Fig. 1, Pl. II, in each end of the lower part of the trough and passes through a screen t Plate II, Fig. 3 of about ⅜ inch mesh and then through a riddle u, Plate II, Fig. 3, of finer mesh, into the winnower; riddles of different sized meshes, being used for different grains. The riddle u is not actually inserted in the model, there being nothing novel in the use of two or more screens and the actual insertion of more than one screen not therefore being deemed necessary.

The blower of the winnower, is driven by a band 8, running from a small pulley, on the thresher shaft so as to diminish its speed, and passing through sheaves v, v, Figs. 1 and 3, Pl. II, and then around a large pulley w, w, on the blower shaft. Upon the blower shaft, I generally have two or three pulleys of different sizes, so that I can change the speed of the blower, whenever desirable. The wind in passing from the blower, is made to pass through a screen, 9, Pl. II, Fig. 3, so as to equalize the blast, and operates upon the chaff, as it falls with the wheat from the riddle u. The chaff is carried or blown off, in the direction indicated by the arrow, in Fig. 3, Pl. II, while the grain falling on the inclined plane 10, Fig. 3, Pl. II, runs down it into any receptacle—bags or otherwise—provided. In order that the grain may be made as clean as possible I place in the inclined plane 10, a fine screen 11, Fig. 3, Pl. II, which allows any fine seed or dust to pass away from the grain.

I am aware that straw separators have been used in connection with threshing machines, and that fanning mills have also been used in such connection, and I disclaim any invention, as respects such general connection or combination.

I am also aware that the form of the wire rack *z*, is not new, but has been used for similar purposes as that to which I apply it. But the peculiar arrangement and position of the straw separator and fanning mill by which the straw is carried on top of and over the fanning mill, and is discharged at right angles to the line of direction, of the current of air from the fanning mill, which acts upon the chaff and light dirt is new, and has not been used or known, so far as I am aware, before my invention thereof.

The peculiar construction of the shaking lever, Fig. 2 Pl. II, and the manner of its working from the fanning mill, is also novel, according to the best of my knowledge.

By connecting the straw separator and winnower, with the thresher, by means of the trough *m*, or the extended hood *f*, I am enabled to clean the grain as rapidly as it is threshed, as by this arrangement, I am able to avail myself of the current of air created by the revolution of the flails, and to render it of assistance in the cleaning of the grain in addition to that derived from the blower of the winnower.

The winnower may be used in connection with the thresher on all occasions, if desired, but in cases, as before stated, where the grain is smutty, I prefer to use the thresher, without the winnower.

The principal features of my thresher which distinguish it from and render it superior to ordinary threshing machines, are, 1st, that I effect the separation, of the grain from the straw, by the use of a rotating wheel or wheels, having but a few spokes or arms in connection with adjustable rubbers, instead of having to use a long revolving drum, as in other threshers, and I am enabled in the manner, to dispense entirely, with the use of spikes which are always liable to be thrown out of their cylinder and are the very frequent cause of serious and fatal accidents. I also place the feeder, or operator at the side instead of in front of the rotating part, in this way also lessening the liability to accident or injury. 2nd. With a given power, and in a given length of time, I am able to perform more work with my thresher, than can be performed with the same power, and in the same length of time, by any other thresher now in use. 3d. My thresher entirely separates, the grain from the straw (whereas other threshers leave more or less of the grain unthreshed) thus effecting a great and valuable saving in the products of labor, and greatly increasing in the aggregate, the quantity of grain, secured from the threshing. Frequent and actual and careful experiments, prove the last two propositions.

What I claim as my invention and desire to secure by Letters Patent is—

1. The peculiar form and construction of the furrowed surfaces of the flanches 2 and rubbers 3 as particularly described in my specification.

2. I claim also the combination of such rubbers, which are adjustable, with such flanches and their arrangement, as before described, upon the opposite sides of the flail case; and also the combination of such furrowed rubbers and flanches, substantially in the manner, and for the purposes before set forth, with the rotating flails *d*, *d*.

W. RUSSELL PALMER.

Witnesses:
S. D. LAW,
HALL COTTEY.